(12) United States Patent
Misra et al.

(10) Patent No.: US 9,505,615 B2
(45) Date of Patent: Nov. 29, 2016

(54) METHOD FOR CONTROLLING MICROSTRUCTURAL ARRANGEMENT OF NOMINALLY-ALIGNED ARRAYS OF CARBON NANOTUBES

(71) Applicant: CALIFORNIA INSTITUTE OF TECHNOLOGY, Pasadena, CA (US)

(72) Inventors: Abha Misra, Bangalore (IN); Chiara Daraio, Pasadena, CA (US); Jordan R. Raney, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 102 days.

(21) Appl. No.: 13/868,952

(22) Filed: Apr. 23, 2013

(65) Prior Publication Data
US 2014/0205829 A1    Jul. 24, 2014

Related U.S. Application Data

(63) Continuation-in-part of application No. 13/491,014, filed on Jun. 7, 2012, now Pat. No. 9,045,343.

(60) Provisional application No. 61/638,970, filed on Apr. 26, 2012, provisional application No. 61/512,318, filed on Jul. 27, 2011.

(51) Int. Cl.
*C01B 31/02* (2006.01)
*B82Y 30/00* (2011.01)
(Continued)

(52) U.S. Cl.
CPC .............. *B82Y 30/00* (2013.01); *B82Y 40/00* (2013.01); *C01B 31/0226* (2013.01); *C01B 31/0273* (2013.01); *C01B 31/0438* (2013.01); *C01B 2202/08* (2013.01); *Y10T 428/249921* (2015.04)

(58) Field of Classification Search
CPC ............ C01B 31/022; C01B 31/0226; C01B 31/0233; C01B 31/024; C01B 31/0246; C01B 31/0253; C01B 31/026; C01B 31/0266; C01B 31/0273; C01B 31/028; C01B 31/0286; C01B 31/0293; C01B 2202/00; C01B 2202/02; C01B 2202/04
USPC ............... 423/447.1–447.3, 445 B, 325; 977/742–754, 842–848; 428/211; 558/38
See application file for complete search history.

(56) References Cited

U.S. PATENT DOCUMENTS 3,328,124 A * 6/1967 Mays ................ A01N 25/08
                                                  106/426
6,872,403 B2 * 3/2005 Pienkowski et al. ......... 424/422
(Continued)

FOREIGN PATENT DOCUMENTS

WO    WO 2011/143777    * 11/2011 ............... C09C 1/44

OTHER PUBLICATIONS

Bottini, et al., Covalent decoration of milti-walled carbon nanotubes with silica nanoparticles, Chem. Comm. 2005: 758-760.*
(Continued)

*Primary Examiner* — Daniel C McCracken
(74) *Attorney, Agent, or Firm* — Steinfl & Bruno, LLP

(57) ABSTRACT

A method for controlling the microstructural arrangement of nominally-aligned arrays of carbon nanotubes (CNTs) and a foam structure of CNTs are disclosed. The method includes a functionalization of CNT surfaces, for example, a non-covalent functionalization. The non-covalent functionalization of CNT surfaces can be obtained by way of a wetting process, for example by the use of a solution of surfactant or silica ($SiO_2$) nanoparticles to wet the CNTs. In particular, the CNT array is first detached from the growth substrate and then a functionalization substance (surfactant or $SiO_2$) is added to the CNT array. The functionalization substance can be dissolved in a volatile solvent, such that CNT arrays densify after the solvent evaporates. A method for synthesizing nominally-aligned arrays of carbon nanotubes (CNTs) is further disclosed, wherein the synthesizing method is combined with the wetting process.

12 Claims, 8 Drawing Sheets

(51) Int. Cl.
C01B 31/04 (2006.01)
B82Y 40/00 (2011.01)

(56) References Cited

U.S. PATENT DOCUMENTS

| | | | |
|---|---|---|---|
| 7,204,970 | B2 | 4/2007 | Smalley et al. |
| 7,727,624 | B2 | 6/2010 | Cao et al. |
| 2002/0102193 | A1 | 8/2002 | Smalley et al. |
| 2006/0073089 | A1* | 4/2006 | Ajayan .................. A61L 27/08 423/447.2 |
| 2009/0200912 | A1 | 8/2009 | Ren et al. |
| 2009/0208403 | A1 | 8/2009 | Hussain et al. |
| 2009/0208708 | A1 | 8/2009 | Wei et al. |
| 2009/0278114 | A1 | 11/2009 | Grill et al. |
| 2010/0029063 | A1 | 2/2010 | Gambin et al. |
| 2010/0083489 | A1 | 4/2010 | Eldridge et al. |
| 2010/0187484 | A1 | 7/2010 | Worsley et al. |
| 2010/0227058 | A1 | 9/2010 | Zhang et al. |
| 2011/0133031 | A1 | 6/2011 | Shah et al. |
| 2011/0255212 | A1 | 10/2011 | Liu et al. |

OTHER PUBLICATIONS

Britz, et al., Noncovalent interactions of molecules with single walled carbon nanotubes, Chem. Soc. Rev. 2006; 35: 637-659.*
Li, et al., Efficient Synthesis of Carbon Nanotube-Nanoparticle Hybrids, Adv. Funct. Mater. 2006; 16: 2431-2437.*
Abbaslou R.M., et al. "The effects of carbon concentration in the precursor gas on the quality and quantity of carbon nanotubes synthesized by CVD method." Applied Catalysis A: General 2010; 372(2):147-52.
Abot J.L., et al. "On the mechanical response of carbon nanotube array laminated composite materials." Journal of Reinforced Plastics & Composites 2010; 29(22):3401-10.
Ajdari, A., et al. "Dynamic Crushing and Energy Absorption of Regular, Irregular and Functionally Graded Cellular Structures." Int. J. Solids Struct. 2011,48,506-516.
Ajayan, P. M. et al. Single-Walled Carbon Nanotube-Polymer Composites: Strength and Weakness. Adv. Mater. 2000, 12, 750-753.
Aksak M, et al. "Carbon nanotube diameter tuning using hydrogen amount and temperature on SiO2/Si substrates." Applied Physics A: Materials Science & Processing 2010; 100(1):213-22.
Andrews R, et al. "Continuous production of aligned carbon nanotubes: a step closer to commercial realization." Chemical Physics Letters 1999; 303(5-6):467-74.
Antkowiak, A. et al., "Instant fabrication and selection of folded structures using drop impact." PNAS, Jun. 28, 2011, vol. 108, No. 26, pp. 10400-10404.
Arnold M.S., et al. "Sorting carbon nanotubes by electronic structure using density differentiation." Nature Nanotechnol. 160-5; 2006.
Barker, M. K., et al. "The Relationship of the Compressive Modulus of Articular Cartilage with its Deformation Response to Cyclic Loading: Does Cartilage Optimize its Modulus so as to Minimize the Strains Arising in it Due to the Prevalent Loading Regime?" Rhumatology 2001, 40, 274-284.
Baughman, R. H., et al. "Carbon Nanotube Actuators." Science 1999, 284, 1340-1344.
Baughman, R.H. et al. "Carbon nanotubes: the route toward applications." Science 2002; 297(5582):787-92.
Bittencourt C, et al. "Decorating Carbon Nanotubes with Nickel Nanoparticles." Chem. Phys. Lett. 2007; 436(4-6):368-72.
Bradford P.D., et al. "Tuning the compressive mechanical properties of carbon nanotube foam." Carbon 2011;49(8):2834-41.
Cao, A., et al. "Macroscopic three dimensional arrays of Fe nanoparticles supported in aligned carbon nanotubes." J. Phys. Chem. B 2001, 105, 11937-11940.
Cao, A., et al. "Super-Compressible Foam Like Carbon Nanotube Films." Science 2005, 310, 1307-1310.

Chakrabarti S, et al. "Number Of walls controlled synthesis of millimeter-long vertically aligned brushlike carbon nanotubes." Journal of Physical Chemistry C 2007; 111(5):1929-34.
Chakrapani N., et al. "Capillarity-driven assembly of two-dimensional cellular carbon nanotube foams." Proc. Natl Acad. Sci. 101 4009-12; 2004.
Chandrashekar A, et al. "Forming Carbon Nanotube Composites by Directly Coating Forests with Inorganic Materials Using Low Pressure Chemical Vapor Deposition." Thin Solid Films 2008; 517(2):525-30.
Ci, L. et al. "Continuous Carbon Nanotube Reinforced Composites." Nano Lett. 2008, 8, 2762-2766.
Cui X, et al. "Effect of catalyst particle interspacing on the growth of millimeter-scale carbon nanotube arrays by catalytic chemical vapor deposition." Carbon 2009;47 (15):3441-51.
Cui, L., et al. "Designing the energy absorption capacity of functionally graded foam materials." Materials Science and Engineering A 2009, 507, 215-225.
Daraio, C., et al. "Highly Nonlinear Contact Interaction and Dynamic Energy Dissipation by Forest of Carbon Nanotubes." Appl. Phys. Lett. 2004, 85, 5724-5726.
Deck, C. P., et al. "Growth of well-aligned carbon nanotube structures in successive layers." J. Phys. Chem. B 2005, 109, 12353-12357.
Deck, C.P., et al. "Mechanical behavior of ultralong multiwalled carbon nanotube mats." J. Appl. Phys. 101 023512, 2007.
De Falco, I, et al. "A comparative analysis of evolutionary algorithms for function optimization." In: Proceedings of the Second Workshop on Evolutionary Computation (WEC2), Nagoya, Japan; 1996. p. 29-32.
de Heer W.A., et al. "A carbon nanotube field-emission electron source." Science 1995;270 (5239):1179-80.
Dong L, et al. "Effects of hydrogen on the formation of aligned carbon nanotubes by chemical vapor deposition." Journal of Nanoscience and Nanotechnology 2002;2(2):155-60.
Dresselhaus M.S., et al. "Raman spectroscopy of carbon nanotubes." Physics Reports 2005;409 (2):47-99.
Du, M. et al. "Modification of silica nanoparticles and their application in UDMA dental polymeric composites." Polym. Compos. 28 198-207; 2007.
Eder, D. "Carbon Nanotube-Inorganic Hybrids." Chem. Rev. 2010; 110(3):1348-85.
Ellis, V, et al. "Hydrophobic anchoring of monolayer-protected gold nanoclusters to carbon nanotubes." Nano Lett. 3 (3). pp. 279-282. ISSN 1530-6984, 2003.
El Sayed ,T, et al. "A variational constitutive model for soft biological tissue." J Biomech 2008;41:1458-66.
Falvo, M.R., et al. "Bending and Buckling of Carbon Nanotubes Under Large Strain." Nature 1997; 389(6651):582-4.
Feng, X, et al. "Thermal analysis study of the growth kinetics of carbon nanotubes and epitaxial graphene layers on them." Journal of Physical Chemistry C 2009; 113(22):9623-31.
Fraternali, F, et al. "Multiscale mass-spring models of carbon nanotube foams." J Mech Phys Solids 2011;59(1):89-102.
Fraternali, F, et al. "Optimal design of composite granular protectors." Mech Adv Mater Struct 2010;17(1):1-19.
Gama, B. A., et al. "Aluminum Foam Integral Armor: A New Dimension in Armor Design." Compos. Struct. 2001,52, 381-395.
Garcia, E.J., et al. Fabrication and nanocompression testing of aligned carbon-nanotube-polymer nanocomposites. Adv Mater 2007; 19(16):2151-6.
Gui, X, et al. "Soft, highly conductive nanotube sponges and composites with controlled compressibility." ACS Nano 4 2320-6, 2010.
Guo G, et al. "A Simple Method to Prepare Multi-Walled Carbon Nanotube/ZnO Nanoparticle Composites." Appl. Phys. A. 2007; 89(2):525-8.
Han, C., et al. "Attenuation of Stress Wave Propagation in Periodically Layered Elastic Media." J. Sound Vib. 2001, 243, 747-761.
Han W.Q., et al. "Coating Single-Walled Carbon Nanotubes with Tin Oxide." Nano Lett. 2003; 3(5):681-3.
Holland, J.H., et al. "Outline for a logical theory of adaptive systems." J ACM 1962;9(3):297-314.

(56) References Cited

OTHER PUBLICATIONS

Hutchens, S.B., et al. "In situ mechanical testing reveals periodic buckle nucleation and propagation in carbon nanotube bundles." Advanced Functional Materials 2010; 20(14):2338-46.
Iijima, S., et al. "Structural flexibility of carbon nanotube." J. Structural Flexibility of Carbon Nanotubes. J. Chem. Phys. 1996, 104, 2089-2092.
Jackson, J.J., et al. "Pulsed Growth of Vertically Aligned Nanotube Arrays with Variable Density." ACS Nano 2010; 4:7573-7581.
Jin, X, et al. "Nanoscale Microelectrochemical Cells on Carbon Nanotubes." Small 2007; 3(9):1513-7.
Kaur, S. et al. "Capillarity-driven assembly of carbon nanotubes on substrates into dense vertically aligned arrays." Adv. Mater. 192984-7; 2007.
Kiernan, S., et al. "Propagation of a stress wave through a virtual functionally graded foam." International Journal of Non-Linear Mechanics 2009, 44, 456-468.
Kireitseu, M. V. "Vibration Damping Properties of Nanotube-Reinforced Materials." Adv. Sci. Technol. 2006, 50, 31-36.
Kireitseu, M. V., et al. "Damping Properties of Sandwich Metal-Polymer-Ceramic Coating." Mater. Technol.; Ocean Eng. 2007, 4, 21-26.
Kuang Q, et al. "Controllable Fabrication of $SnO_2$-Coated Multiwalled Carbon Nanotubes by Chemical Vapor Deposition." Carbon 2006; 44(7):1166-72.
Lee, C.J., et al. "Temperature effect on the growth of carbon nanotubes using thermal chemical vapor deposition." Chemical Physics Letters 2001; 343(1-2):33-8.
Li, W.Z., et al. "Large-scale synthesis of aligned carbon nanotubes." Science 1996;274(5293):1701-3.
Li Y., et al. "Growth of single-walled carbon nanotubes from discrete catalytic nanoparticles of various sizes." Journal of Physical Chemistry B 2001;105(46):11424-31.
Li, X.; et al. "Bottom-up growth of carbon nanotube multilayers: unprecedented growth." Nano Letters 2005, 5, 1997-2000.
Li X et al. "Densified Aligned Carbon Nanotube Films via Vapor Phase Infiltration of Carbon." Carbon 2007; 45(4):847-51.
Li X, et al. "Air-assisted growth of ultra-long carbon nanotube bundles." Nanotechnology 2008;19(45):455609.
Liu, Y, et al. "Kabob-Like Carbon Nanotube Hybrids." Chem. Lett. 2006; 35(2):200-1.
Liu, Q, et al. "Diameter selective growth of single-walled carbon nanotubes with high quality by floating catalyst method." ACS Nano 2008;2(8):1722-8.
Liu, M. et al. "Thickness Dependent Mechanical Properties of Polydimethyl Siloxane Membranes." J. Micromech. Microeng. 2009, 19, 035028-035031.
Liu L, et al. "Macroscopic Carbon Nanotube Assemblies: Preparation, Properties, and Potential Applications." Small 2011; 7(11):1504-20.
Loret, B., et al. "Articular Cartilage with Intra- and Extrafibrillar Waters: a Chemo-Mechanical Model." Mech. Mater. 2004, 36, 515-541.
Ma, S.B., et al. "Synthesis and Characterization of Manganese Dioxide Spontaneously Coated on Carbon Nanotubes." Carbon 2007; 45(2):375-82.
Maghrebi, M. et al. "Acetic acid effects on enhancement of growth rate and reduction of amorphous carbon deposition on CNT arrays along a growth window in a floating catalyst reactor." Applied Physics A: Materials Science & Processing 2009;97(2):417-24.
Misra, A.; et al. "Strain rate effects in the mechanical response of polymeranchored carbon nanotube foams." Adv. Mater. 2009, 21, 334-338.
Misra, A., et al. "Effect of Density Variation and Non-Covalent Functionalization on the Compressive Behavior of Carbon Nanotube Arrays." Nanotechnology 2011, 22, 425705-425711.
Misra A, et al. "Synthesis and characterization of carbon nanotube-polymer multilayer structures", ACS Nano 2011;5(10):7713-7721.
Moon, S.Y. et al. "Easy Synthesis of a Nanostructured Hybrid Array Consisting of Gold Nanoparticles and Carbon Nanotubes." Carbon 2009, 47(12):2924-32.
Mühlenbein H., "The science of breeding and its application to the Breeder Genetic Algorithm (BGA)." Evol Comput 1994;1(4):335-60.
Mylvaganam, K.., et al. "Energy Absorption Capacity of Carbon Nanotubes Under Ballistic Impact." Appl. Phys. Lett. 2006, 89, 123127-123130.
Namilae, S. et al. "Role of atomic scale interfaces in the compressive behavior of carbon nanotubes in composites." Compos. Sci. Technol. 66:13, pp. 2030-2038, Oct. 2006.
Naraghi, M. et al. "A Multiscale Study of High Performance Double-Walled Nanotube-Polymer Fibers." ACS Nano 2010, 4, 6463-6476.
Neocleus, S. et al., "Hierarchical Carbon Nanotube-Inorganic Hybrid Structures Involving CNT Arrays and CNT Fibers." Func. Mater. Lett. 2011; 4(1):83-9.
Nessim, G.D., et al. "Tuning of verticallyaligned carbon nanotube diameter and areal density through catalyst pre-treatement." Nano Letters 2008;8(11):3587-93.
Ng K.C., et al. "Individual and Bipolarly Stacked Asymmetrical Aqueous Supercapacitors of $CNTs/SnO_2$ and $CNTs/MnO_2$ Nanocomposites." J. Electrochem. Soc. 2009; 11:A846-53.
O'Connell, M.J. et al. "Band gap fluorescence from individual single-walled carbon nanotubes", Science 297 593-6; 2002.
Okita A, et al. "Effects of hydrogen on carbon nanotube formation in $CH_4/H_2$ plasmas." Carbon 2007;45(7):1518-26.
Otieno, G., et al. "Processing and Properties of Aligned Multi-Walled Carbon Nanotube/Aluminoborosilicate Glass Composites Made by Sol-Gel Processing." Carbon 2010; 48(8):2212-7.
Pinault, M, et al. "Evidence of Sequential Lift in Growth of Aligned Multiwalled Carbon Nanotube Multilayers." Nano Letters 2005; 5:2394-2398.
Puglisi, G, et al. "Thermodynamics of rate independent plasticity." J Mech Phys Solids 2005;53(3):655-79.
Pushparaj, V. L., et al. "Effects of Compressive Strains on Electrical Conductivities of a Macroscale Carbon Nanotube Block." Appl. Phys. Lett. 2007, 91, 153116-153118.
Qian, D., et al., "Mechanics of Carbon Nanotubes." Appl. Mech. Rev. 2002; 55(6):495-532.
Ramachandra, S., et al. "Impact Energy Absorption in an Al Foam at Low Velocities." Scr. Mater. 2003, 49, 741-745.
Rance, G.A., et al. "van der Waals interactions between nanotubes and nanoparticles for controlled assembly of composite nanostructures." ACS Nano. 4(8):4920-8; Aug. 24, 2010.
Raney, J.R., et al. "In situ synthesis of metal oxides in carbon nanotube arrays and mechanical properties of the resulting structures." Carbon 50 (2012); 4432-4440.
Raney, J. R., et al. "Modeling and in Situ Identification of Material Parameters for Layered Structures Based on Carbon Nanotube Arrays." Compos. Struct. 2011, 93, 3013-3018.
Raney, J.R., et al. "Tailoring the microstructure and mechanical properties of arrays of aligned multiwall carbon nanotubes by utilizing different hydrogen concentrations during synthesis." Carbon 2011;49:3631-3638.
Romo-Negreira, A, et al. "Electrochemical tailoring of catalyst nanoparticles for CNT spatial-dimension control." Journal of the Electrochemical Society 2010;157(3):K47-51.
Sansom, E. B., et al. "Controlled Partial Embedding of Carbon Nanotubes within Flexible Transparent Layers." Nanotechnology 2008, 19, 035302-035308.
Shin, M. et al. "Elastomeric Conductive Composites Based on Carbon Nanotube Forests." Adv. Mater. 2010, 22, 2663-2667.
Suhr, J., et al. "Viscoelasticity in Carbon Nanotube Composites." Nat. Mater. 2005, 4, 134-137.
Suhr, J. et al. "Fatigue resistance of aligned carbon nanotube arrays under cyclic compression." Nature Nano 2007;2(7):417-21.
Suresh, S. et al. "Graded materials for resistance to contact deformation and damage." Science 2001; 292(5526):2447-51.
Tong, T. et al. "Height independent compressive modulus of vertically aligned carbon nanotube arrays." Nano Letters 2008;8(2):511-5.

(56) References Cited

OTHER PUBLICATIONS

Toth, G. et al. "Carbonnanotube- based electrical brush contacts." Adv Mater 2009; 21(20):2054-8.
Tummala, N.R., et al. "SDS surfactants on carbon nanotubes: aggregate morphology." ACS Nano. (3) 595-602; 2009.
Vaisman, L., et al. "The role of surfactants in dispersion of carbon nanotubes." Adv. Colloid Interface Sci. 128 37-46; 2006.
Wang, C.M., et al. "Recent studies on buckling of carbon nanotubes." Applied Mechanics Reviews 2010;63(3):030804.
Wang, W., et al. "Vertically Aligned Silicon/Carbon Nanotube (VASCNT) Arrays: Hierarchical Anodes for Lithium-Ion Battery." Electrochem. Comm. 2011; 13(5):429-32.
Wang, E. et al. "The blast resistance of sandwich composites with stepwise graded cores." International Journal of Solids and Structures 2009, 46, 3492-3502.
Wasel, W., et al. "Experimental characterization of the role of hydrogen in CVD Synthesis of MWCNTs." Carbon 2007;45(4):833-8.
Xie, X.L., et al. "Dispersion and Alignment of Carbon Nanotubes in Polymer Matrix: A Review." Mater. Sci. Eng. R 2005; 49(4):89-112.
Yakobson, B.I., et al. "Nanomechanics of Carbon Tubes: Instabilities beyond Linear Response." Phys. Rev. Lett. 1996; 76(14):2511-4.
Yang, J., et al. A New Device for Measuring Density of Jaw Bones. Dentomaxillo facial Radiol. 2002, 31, 313-316.
Yurekli, K, et al. "Small-angle neutron scattering from surfactant-assisted aqueous dispersions of carbon nanotubes." J. Am. Chem. Soc. 126 9902-3; 2004.
Zhang, M., et al. "Multifunctional Carbon Nanotube Yarns by Downsizing an Ancient Technology." Science 2004, 306, 1358-1361.
Zhang G, et al. "Ultra-high-yield growth of vertical single-walled carbon nanotubes: hidden roles of hydrogen and oxygen." Proceedings of the National Academy of Sciences of the United States of America 2005;102(45):16141-5.
Zhang H., et al. "Influence of ethylene and hydrogen flow rates on the wall number, crystallinity, and length of millimeter-long carbon nanotube array." Journal of Physical Chemistry C 2008;112(33):12706-9.
Zhang, H.L., et al. "Kinetically Controlled Catalytic Synthesis of Highly Dispersed Metal-in-Carbon Composite and its Electrochemical Behavior." J. Mater. Chem. 2009; 19(47):9006-11.
Zhang, Q., et al. "Energy-Absorbing Hybrid Composites Based on Alternate Carbon-Nanotube and Inorganic Layers." Adv. Mater. 2009, 21, 2876-2880.
Zhao, B., et al. "Improvement on Wettability Between Carbon Nanotubes and Sn." Surface Engineering 2009; 25(1):31-5.
Zhou, J.J., et al. "Flow conveying and diagnosis with carbon nanotube arrays." Nanotechnology 17, 4845-53, 2006.
PCT International Search Report issued for PCT Application No. PCT/US2012/041275 filed on Jun. 7, 2012 in the name of California Institute of Technology et al. Mail Date: Apr. 25, 2013.
PCT Written Opinion issued for PCT Application No. PCT/US2012/041275 filed on Jun. 7, 2012 in the name of California Institute of Technology et al. Mail Date: Apr. 25, 2013.
Non-Final Office Action issued for U.S. Appl. No. 13/491,014, filed Jun. 7, 2012 in the name of Jordan R. Raney et al. date issued: Feb. 5, 2014.
Lu, C., et al. *Controlling the Diameter of Carbon Nanotubes in Chemical Vapor Deposition Method by Carbon Feeding.* J. Phys. Chem. B, vol. 110, pp. 20254-20257. 2006.
Bradford, P.D., et al. *Tuning the compressive mechanical properties of carbon nanotube foam.* Carbon, vol. 49, pp. 2834-2841. 2011.
Non-Final Office Action issued for U.S. Appl. No. 13/491,014, filed Jun. 7, 2012 in the name of Jordan R. Raney et al. date issued: Oct. 3, 2014.
Behr, M.J., et al. Effects of hydrogen on catalysts nanoparticles in carbon nanotube growth. Journal of Applied Physics, vol. 108, 053303, pp. 1-8. 2010.

Zhang, Y., et al. *Tailoring the Morphology of Carbon Nanotube Arrays: From Spinnable Forests to Undulating Foams.* ACS Nano, vol. 3, No. 8, pp. 2157-2162. 2009.
Maghrebi M, Khodadadi AA, Mortazavi Y, Sane A, Rahimi M, Shirazi Y, et al. Acetic acid effects on enhancement of growth rate and reduction of amorphous carbon deposition on CNT arrays along a growth window in a floating catalyst reactor. *Applied Physics A: Materials Science & Processing* 2009; 97(2):417-24.
Cao AY, et al. Super-compressible foam like carbon nanotube films, *Science* 2005; 310 (5752):1307-10.
Ajayan, P. M.; Schadler, L. S.; Giannaris, C.; Rubio, A. Single Walled Carbon Nanotube: Polymer Composites: Strength and Weakness. Adv. Mater. 2000, 12,750-753.
Barker, M. K.; Seedhom, B. B. The Relationship of the Compressive Modulus of Articular Cartilage with its Deformation Response to Cyclic Loading: Does Cartilage Optimize its Modulus so as to Minimize the Strains Arising in it Due to the Prevalent Loading Regime? *Rheumatology* 2001, 40,274-284.
Baughman, R.H. et al., Carbon nanotubes: the route toward applications, *Science*, 2002, vol. 297, Issue 5582, pp. 787-792.
Raney, J.R. et al., *Tailoring the microstructure and mechanical properties of arrays of aligned multiwall carbon nanotubes by utilizing different hydrogen concentrations during synthesis*, Carbon, 2011, 49, pp. 3631-3638.
Jackson, J.J. et al., *Pulsed Growth of Vertically Aligned Nanotube Arrays with Variable Density*, ACS Nano, 2010, 4, pp. 7573-7581.
Liu, Q. et al., *Diameter-selective growth of single-walled carbon nanotubes with high quality by floating catalyst method*, ACS Nano, 2008, 2(8), pp. 1722-1728.
Okita, A. et al., *Effects of hydrogen on carbon nanotube formation in CH4/H2 plasmas*, Carbon, 2007, 45(7), pp. 1518-1526.
Nessim, G.D. et al., *Tuning of vertically-aligned carbon nanotube diameter and areal density through catalyst pre-treatement*, Nano Letters, 2008, 8(11), pp. 3587-3593.
Dresselhaus, M.S. et al, *Raman spectroscopy of carbon nanotubes*, Physics Reports, 2005, 409(2), pp. 47-99.
Misra, A. et al., *Effect of density variation and non-covalent functionalization on the compressive behavior of carbon nanotube arrays*, Nanotechnol., 2011, 22,425705, pp. 1-7.
Suhr, J. et al., *Fatigue resistance of aligned carbon nanotube arrays under cyclic compression*, Nature Nano, 2007, 2(7), pp. 1-5.
Li, X. et al., *Bottom-up growth of carbon nanotube multilayers: unprecedented growth*, Nano Letters, 2005, 5, pp. 1997-2000.
15-Misra, A. et al., *Strain rate effects in the mechanical response of polymer-anchored carbon nanotube foams*, Adv. Mater., 2009, 21, pp. 334-338.
Ajdari, A. et al., *Dynamic crushing and energy absorption of regular, irregular and functionally graded cellular structures*, International Journal of Solids and Structures, 2011, 48, pp. 506-516.
Wang, E. et al., *The blast resistance of sandwich composites with stepwise graded cores*, International Journal of Solids and Structures, 2009, 46, pp. 3492-3502.
Pushparaj, V.L. et al., *Effects of compressive strains on electrical conductivities of a macroscale carbon nanotube block*, Appl. Phys. Lett., 2007, 91, 153116-1-153116-3.
Zhang, G. et al., *Ultra-high-yield growth of vertical single-walled carbon nanotubes: hidden roles of hydrogen and oxygen*, Proceedings of the National Academy of Sciences of the United States of America, 2005,102(45), pp. 16141-16145.
Antkowiak, A. et al., Instant fabrication and selection of folded structures using drop impact, *PNAS*, Jun. 28, 2011, vol. 108, No. 26, pp. 10400-10404.
Notice of Allowance issued for U.S. Appl. No. 13/491,014, filed Jun. 7, 2012 in the name of Jordan R. Raney et al. date issued: Feb. 18, 2015.
Non-Final Office Action mailed on Oct. 21, 2015 for U.S. Appl. No. 14/700,035, filed Apr. 29, 2015 in the name of California Institute of Technology, 5 pages.
Final Office Action mailed on Jan. 21, 2016 for U.S. Appl. No. 14/700,035, filed Apr. 29, 2015 in the name of California Institute of Technology, 6 pages.

(56) References Cited

OTHER PUBLICATIONS

Restriction Requirement mailed on Oct. 2, 2015 for U.S. Appl. No. 13/866,596, filed Apr. 19, 2013 in the name of California Institute of Technology, 7 pages.
Restriction Requirement mailed on Oct. 2, 2015 for U.S. Appl. No. 13/870,954, filed Apr. 25, 2013 in the name of California Institute of Technology, 7 pages.
Yaglioglu O., "Carbon nanotube based electromechanical probes." Massachusetts Institute of Technology, PhD Thesis, Cambridge, MA, USA, Jun. 2007, total of 137 pages, in three parts.
Cui. Dense and long carbon nanotube arrays decorated with Mn3O4 nanoparticles for electrodes of electrochimical supercapacitors, Carbon 49, 2011, pp. 1225-1234.
Pint Three dimensional solid-state supercapacitors from aligned single-walled carbon nanotube array templates, Carbon 49, 2011, pp. 4890-4897.
Xia Nanoflaky MnO2/carbon nanotube nanocomposites as anode materials for lithium-ion batteries, Journal of Materials Chemistry, 2010 vol. 20, pp. 6896-6902.
Zhang "Carbon nanotube arrays and their composites for electrochemical capacitors and lithium-ion batteries" Jul. 2009, Energy and Environmental Science, 2. pp. 932-943.
Non-Final Office Action for U.S. Appl. No. 13/866,596, filed Apr. 19, 2013 on behalf of Chiara Daraio. Mail Date: Mar. 3, 2016. 17 pages.
Non-Final Office Action for U.S. Appl. No. 13/870,954, filed Apr. 25, 2013 on behalf of Chiara Daraio. Mail Date: Mar. 22, 2016. 23 pages.
Notice of Allowance for U.S. Appl. No. 13/491,014, filed Jun. 7, 2012 on behalf of Jordan R. Raney. Mail Date: Feb. 18, 2015. 8 pages.
Applicant-Initiated Interview Summary for U.S. Appl. No. 14/700,035, filed Apr. 29, 2015 on behalf of Jordan R. Raney. Mail Date: Mar. 18, 2016. 3 pages.
Non-Final Office Action for U.S. Appl. No. 14/700,035, filed Apr. 29, 2015 on behalf of Jordan R. Raney. Mail Date: May 10, 2016. 17 pages.

* cited by examiner

US 9,505,615 B2

METHOD FOR CONTROLLING MICROSTRUCTURAL ARRANGEMENT OF NOMINALLY-ALIGNED ARRAYS OF CARBON NANOTUBES

CROSS REFERENCE TO RELATED APPLICATIONS

The present application claims priority to U.S. Provisional Application No. 61/638,970, filed on Apr. 26, 2012, which is incorporated herein by reference in its entirety. The present application is a Continuation-in-Part application of U.S. patent application Ser. No. 13/491,014, filed on Jun. 7, 2012, which discloses a method for controlling microstructural arrangement of nominally-aligned arrays of carbon nanotubes and is also incorporated herein by reference in its entirety. The present application can be related to U.S. application Ser. No. 13/866,596, entitled "Multilayer Foam Structures Of Nominally-Aligned Carbon Nanotubes (CNTs)", filed on Apr. 19, 2013, which is incorporated herein by reference in its entirety.

STATEMENT OF GOVERNMENT GRANT

This invention was made with government support under W911NF-09-D-0001 awarded by the Army Research Office. The government has certain rights in the invention.

FIELD

The present disclosure relates to a method for controlling microstructural arrangement of nominally-aligned arrays of carbon nanotubes (CNTs). The present disclosure further relates to carbon nanotube foams with controllable mechanical properties. Moreover, the present disclosure relates to a method for synthesizing nominally-aligned arrays of carbon nanotubes (CNTs) in combination with the controlling method.

BACKGROUND

Nominally-aligned arrays of carbon nanotubes (CNTs) can behave as low-density energy dissipative foams under compression. The material can be readily synthesized using standard thermal chemical vapor deposition techniques, resulting in a foam-like bulk material consisting of trillions of CNTs per square centimeter. However, these systems have remained largely unused in practical applications due to large variations in properties that result from the synthesis process.

SUMMARY

According to a first aspect of the present disclosure, a method for controlling microstructural arrangement of nominally-aligned arrays of carbon nanotubes (CNTs) is provided. The method comprises functionalizing CNT surfaces.

According to a second aspect of the present disclosure, a method for synthesizing nominally-aligned arrays of carbon nanotubes (CNTs) is provided. The method comprises determining a relationship between a flow direction of a carrier gas carrying a precursor solution and a density of a foam structure and synthesizing the arrays of CNTs by controlling the flow direction of the carrier gas in relation to a growth of the nominally-aligned arrays of carbon nanotubes to increase the density of the foam structure, where the density of the foam structure is higher in regions closer to a flow input of the carrier gas carrying the precursor solution than regions far from the flow input of the carrier gas carrying the precursor solution, where the foam structure density decreases gradually as CNTs grow farther from the flow input and to further control the density of the foam structure, synthesized arrays of CNTs are wetted in a solution comprising a functionalization substance.

According to a third aspect of the disclosure, a foam structure comprising nominally-aligned arrays of carbon nanotubes (CNTs) is provided. The foam structure further comprises a functionalization substance associated or attached to CNT surfaces.

Further aspects of the disclosure are shown in the specification, drawings and claims of the present application.

DETAILED DESCRIPTION

Figure 1:
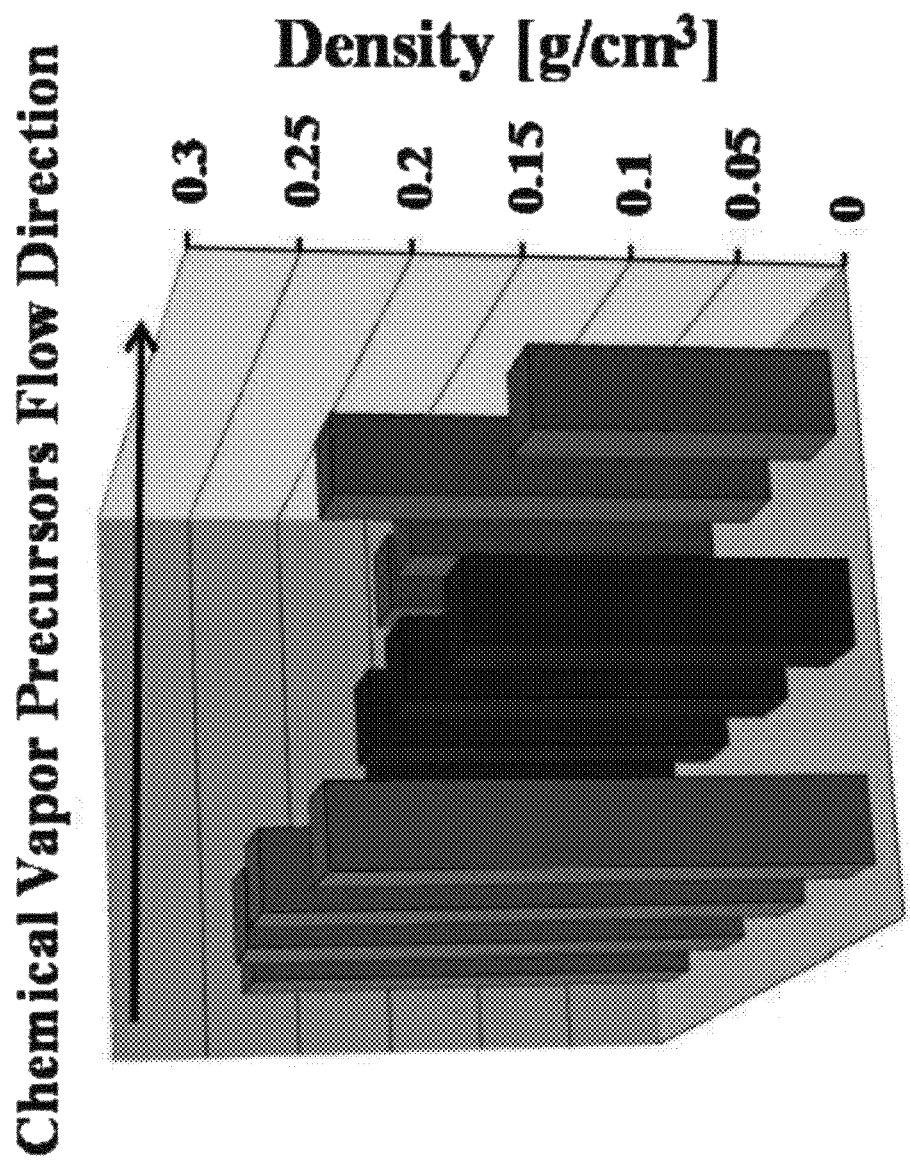
FIG. 1 shows density variation of as-grown carbon nanotubes as a function of the position on the substrate, where an arrow on top indicates the direction of the chemical precursors' flow.

Throughout the present disclosure, embodiments and variations are described for the purpose of illustrating uses and implementations of the inventive concept. The illustrative description should be understood as presenting examples of the inventive concept, rather than as limiting the scope of the concept as disclosed herein. Like reference numerals indicate corresponding parts in various figures. The words and phrases used in the present disclosure should be understood and interpreted to have a meaning consistent with the understanding of those words and phrases by those skilled in the relevant art.

In the present disclosure, the expression "nominally-aligned arrays of carbon nanotubes" can be used to refer to ordered structures or arrangements of nanotubes which can naturally align themselves and can be held together by van der Waals forces and lateral entanglement of the CNTs, which are not perfectly parallel (hence "nominally-aligned"). In this context, the term "alignment" can refer to "bundles" or "groups" of CNTs, and not specifically on the alignment of the individual tubes in the arrangement.

In the present disclosure, the expression "synthesis", which is, for example, included in the expression "synthesis process", "synthesis parameters" or "method for synthesizing", can refer to a process in which volatile or gas-phase precursors including a carbon source react on a substrate, leading to nanotube growth. In some embodiments of the present disclosure, the synthesis can be a process based on chemical vapor deposition (CVD). According to some example embodiments of the present disclosure, CVD synthesis can be achieved by taking carbon species in the gas phase and using an energy source, such as plasma, a resistively heated coil or heat in general, such as, the heat of a heated furnace to impart energy to a gaseous carbon molecule. For example, gaseous carbon sources can include toluene, methane, carbon monoxide, and acetylene. The energy source can be used to "crack" the carbon molecule into a reactive radical species. These radical reactive species can then be diffused down to the substrate, which can be heated and coated in a catalyst (for example, a first row transition metal such as Ni, Fe, or, Co) where it can bond. According to some example embodiments, the synthesis of nominally-aligned CNTs can include a floating catalyst thermal chemical vapor deposition (TCVD) system that can include a reaction zone (furnace), a precursor solution including a catalyst and a carbon source, and a carrier gas to move the solution into the reaction zone. The synthesis of the CNTs can take place on a thermally oxidized surface, for example, Si surface, placed inside the furnace prior to the reaction.

In accordance with the present disclosure, the expression "functionalization" or "functionalizing" can refer to a modification or alteration of grown CNTs by addition of (functionalization) substances to modify CNTs' interactions. The expression "non-covalent functionalization" can refer to a modification or alteration of the CNTs' by way of non-covalent interactions between functionalization substances and CNTs' surfaces. For example, the interactions can be van der Waals interactions and/or ionic charges on the CNTs' surfaces.

Typical elastomeric open cell foams can be constructed out of polymeric materials and can exhibit a hysteretic, energy-dissipative response under compression. A response of carbon nanotube (CNT) foam under compression can provide three distinct regimes of deformation (i.e. divided by the two vertical lines), when used as a protective layer. The "protective threshold" can determine the maximum pressure beyond which unacceptable damage can take place. Open cell foams can be used as lightweight protective layers for a variety of applications. Moreover, the open cell foams can have three distinct regions of behavior when compressed. For example, at small strains, the material can respond in a linear elastic fashion. For intermediate strains, the material can enter a plateau regime throughout which the stress increases a small amount with increasing strain. For large strains, the foam can transition to a densification regime in which stress can rise rapidly for small increases in strains. In practical applications, having a wide plateau can be useful, as it can result in a large amount of energy dissipation prior to a dramatic rise in transmitted force (densification). In some embodiments, it could be useful to know the stress level at which the plateau is approximately located, as this can be the force transmitted through the foam to the protected material underneath for most of the compression. Foams can therefore be selected according to the protective threshold required by the application, with the plateau stress of the foam somewhere less than the threshold. In some embodiments, once densification occurs, the rapid rise in stress can quickly result in damage to an object to be protected by the foam.

Moreover, in comparing the performance of this material to that of typical polymeric foams of comparable density (0.1-0.3 g cm$^{-3}$), it can be observed that the CNT foams dissipate at least 200 times the amount of energy in quasi-static compression tests under 0.8 strain [see for example reference 1, incorporated herein by reference in its entirety].

According to an example embodiment of the present disclosure, a process for synthesizing nominally-aligned arrays of carbon nanotubes (CNTs) uses a floating catalyst thermal chemical vapor deposition (CVD) system, which can be used to synthesize foam-like arrays of CNTs, can have a furnace (reaction zone), a precursor solution comprising a catalyst and a carbon source, and a carrier gas to move the solution into the reaction zone. A process for synthesizing CNTs is disclosed, for example, in U.S. patent application Ser. No. 13/491,014 filed on Jun. 7, 2012, mentioned above and incorporated herein by reference in its entirety.

In accordance with the present disclosure, the synthesis of the CNTs can take place on a thermally oxidized Si surface placed inside the furnace prior to the reaction. This setup can have many variables that could affect the resulting CNT arrays, including flow rate and composition of carrier gas, flow rate and composition of precursor solution, and temperature. General processes to control the resulting material properties both at a microstructural level (e.g., the average CNT diameter) as well as the bulk level (e.g., the foam's stiffness and energy-dissipation properties) are known to the person skilled in the art and will not be described here in detail. These processes can enable reproducibility in the manufacturing process and customizability toward applications by the tuning of the foam's mechanical properties.

According to several example embodiments of the present disclosure, to further control the properties of the foam-like material, a method for controlling microstructural arrangement of CNTs in arrays of CNTs can be obtained. The method can include a non-covalent functionalization of CNT surfaces. In particular, according to some embodiments of the present disclosure, functionalization of CNT surfaces can be obtained, for example, by addition of surfactant (such as, for example, sodium dodecyl sulfate (SDS)) to the CNTs, or by attachment of silica ($SiO_2$) nanoparticles to the CNT walls. The addition of surfactant (SDS) to the CNT or the attachment of silica ($SiO_2$) can be useful to control the microstructural arrangement of the CNTs in the arrays, and to tune the mechanical response of the arrays after growth.

According to some embodiments of the present disclosure, the addition of surfactant (SDS) to the CNTs or the attachment of silica ($SiO_2$) can be obtained by way of a wetting process.

In the example embodiment of FIG. 1, an arrow indicates the direction of the gas flow inside the chamber with respect to the substrate position. From FIG. 1, it can be observed that, the as-grown CNTs' density is higher in the substrate regions closer to the gas flow input, and it decreases gradually as the CNTs grow farther from the flow input. In particular, as shown in the example embodiment of FIG. 1, CNT arrays grown in the substrate's sections closer to the gas inlet could have higher densities. More details on FIG. 1 will be discussed in later sections of this disclosure.

A study on the effects of non-covalent functionalization of the CNT surfaces on the structural and mechanical properties of vertically aligned CNT arrays can be found in reference 6, incorporated herein by reference in its entirety. In this study, it was observed that non-covalent surface functionalization can have an effect on the compressive mechanical responses of carbon nanotube arrays. Moreover, in the previously indicated study (see for example, reference 6, incorporated herein by reference in its entirety) it was also observed that the density of the samples after synthesis in a thermal CVD system is a function of their position on the substrate in the reactor relative to the carrier gas flow direction, which can have an effect on the stiffness of the as-grown samples.

In accordance with the present disclosure, a method for controlling the mechanical properties of a foam structure of CNTs can include a combination of functionalization of CNT surfaces and a selection of the position on a growth substrate from which a CNT sample is selected (in order to obtain a desired sample density). In relation to a synthesis process of CNTs, vertically aligned arrays of carbon nanotubes can be grown using a floating catalyst TCVD method. The microstructure of the resulting arrays can be hierarchical, for example, at the mesoscale CNT bundles can grow vertically away from the substrates, and at the micro-scale (within these bundles) the individual CNTs can grow highly entangled with their neighbors. The TCVD system can include a single furnace utilizing a quartz tube through which the precursor vapors can pass into the heating zone. Source precursors (for example, 0.02 g ferrocene per milliliter of toluene) can be introduced directly into the quartz tube before entering the heating zone. The growth substrates can be for example, silicon wafers with a 1 µm thick thermal oxide layer (area ~3×2 $cm^2$), and can be placed at the center of a high temperature (825° C.) zone in the furnace. After the completed growth, small sections of the CNT arrays (~7×7 $mm^2$) can be separated from the substrates using a razor blade to obtain freestanding samples for the testing. The bulk densities of the freestanding samples can be calculated by dividing the measured mass of each sample by its measured volume. The density of the CNT samples can vary between 0.12 and 0.28 g $cm^3$, depending on the position of the CNT sections on the growth substrate with respect to the carrier gas flow direction (for example, CNT arrays grown in the substrate's sections closer to the gas inlet can have higher densities).

Figure 3A:
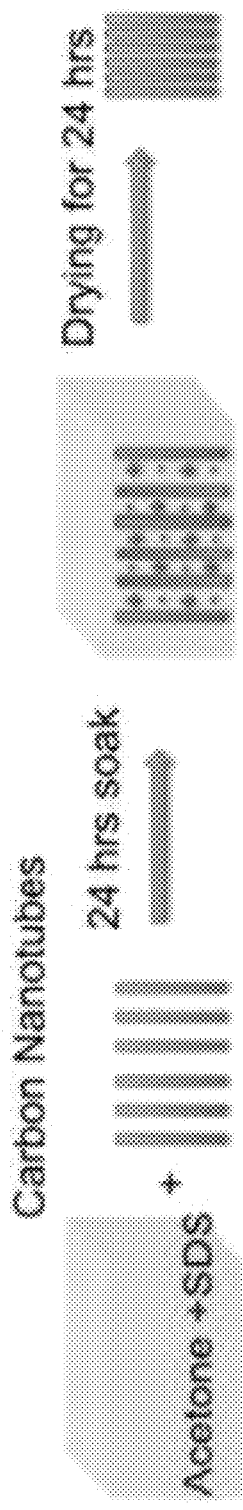
FIG. 3A shows a schematic diagram of a wetting process of CNTs, where freestanding carbon nanotubes are first soaked in the acetone/surfactant solution, and then dried.
Figure 3B:
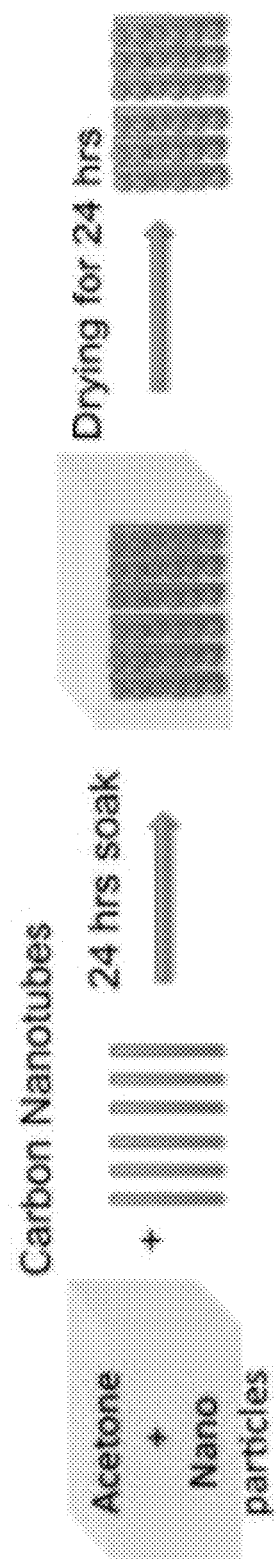
FIG. 3B shows a schematic diagram of a wetting process of CNTs, where freestanding carbon nanotubes are soaked in a solution of acetone and nanoparticles.

According to several example embodiments of the present disclosure, the exemplary schematic diagrams of FIGS. 3A and 3B show the wetting processes of CNTs in acetone with dispersed SDS and $SiO_2$ nanoparticles, respectively. In relation to non-covalent functionalization, the CNT arrays can be functionalized by two methods. According to a first method, in the first step, the CNT arrays can be separated from the growth substrate and then can be wetted in 15 ml of volatile acetone containing 0.02 g of dispersed silica nanoparticles (for example, with diameters ~10-20 nm). In a second step, the CNT arrays can be separated first from the growth substrate, and then can be immersed in acetone containing sodium dodecyl sulfate (SDS) instead of the silica ($SiO_2$) particles. The solutions containing acetone and nanoparticles or surfactant can be ultrasonicated, for example, for 30 min to obtain uniform dispersions. The freestanding CNT samples can then be soaked in the ultrasonicated solutions, for example, for 24 h and can be dried for the next 24 h. Due to the high vapor pressure of such solvents, they can rapidly evaporate, leaving the molecules or nanoparticles behind. The interaction of these materials with the CNTs can cause changes in the microstructure due to CNT-particle interactions (for example, see the images of morphological changes in FIGS. 4A-4D), and ultimately this can lead to changed mechanical properties at the bulk scale.

Furthermore, in accordance with the present disclosure, before mechanical testing, the as-grown and chemically treated CNT samples can be analyzed with high resolution scanning electron microscopy (for example, HR-SEM), to identify emerging microstructural features caused by the different preparation processes. A SEM image acquired from the as grown CNTs is shown in the exemplary schematic diagram of FIG. 4A. From the exemplary schematic diagram of FIG. 4A, the effect of acetone wetting on the microstructure of the CNT arrays, without the addition of surfactant or nanoparticles can be observed. In such cases, the samples can show the formation of typical crack patterns (for example, see the exemplary schematic diagram of FIG. 4B), resulting after evaporation of the liquid. The formation of such patterns on wetted CNT arrays can be attributed to the presence of strong capillary forces during the liquid evaporation [see for example, references 7 and 8, incorporated herein by reference in their entirety].

Figure 4A:
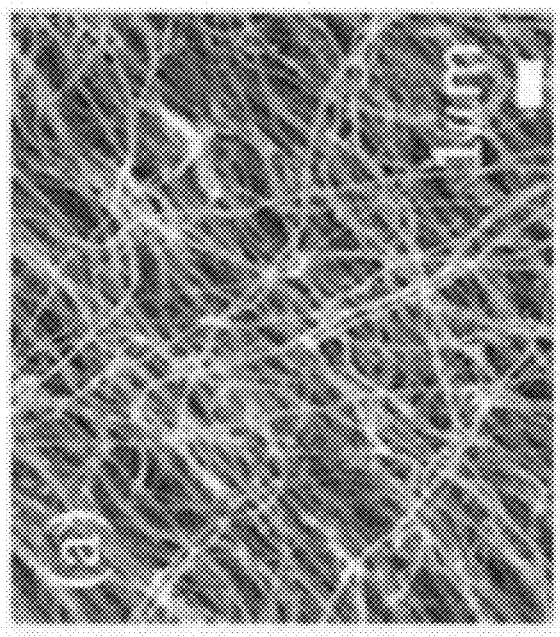
FIG. 4A shows a scanning electron microscope image of the microstructure of untreated carbon nanotube arrays prior to being functionalized.
Figure 4B:
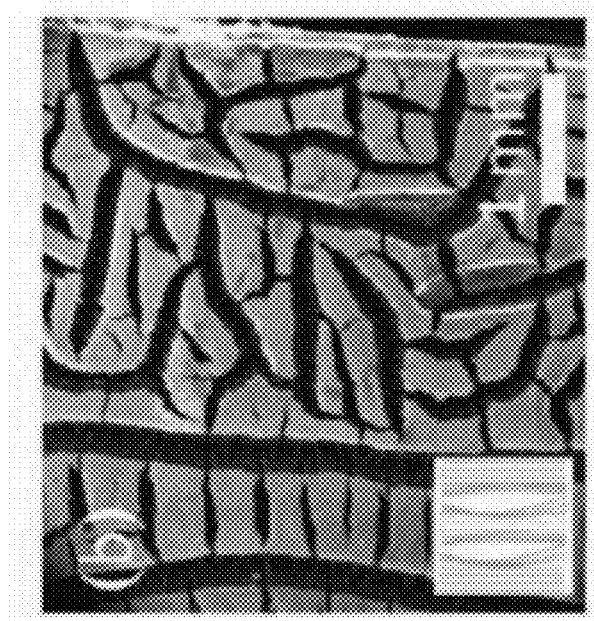
FIG. 4B shows a top-view of scanning electron microscope image of the surface of a CNT array showing macroscopic cracks formed in the freestanding samples after being wetted only with acetone and dried in air.
Figure 4C:
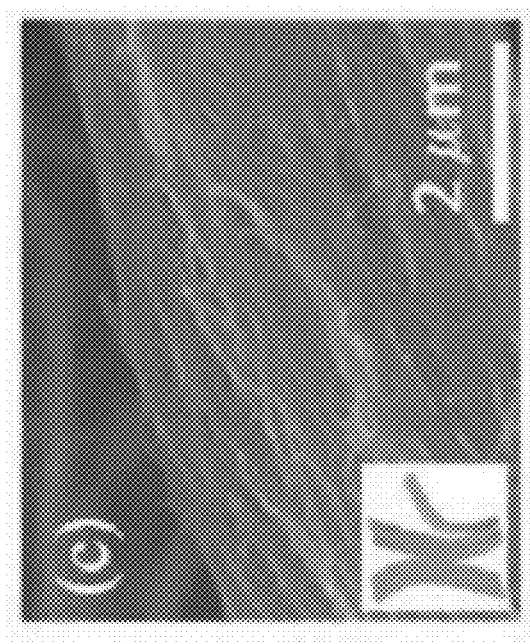
FIG. 4C shows a scanning electron microscope image of a microstructure of a CNT sample treated with acetone and SDS surfactant, where carbon nanotubes form dense bundles.
Figure 4D:
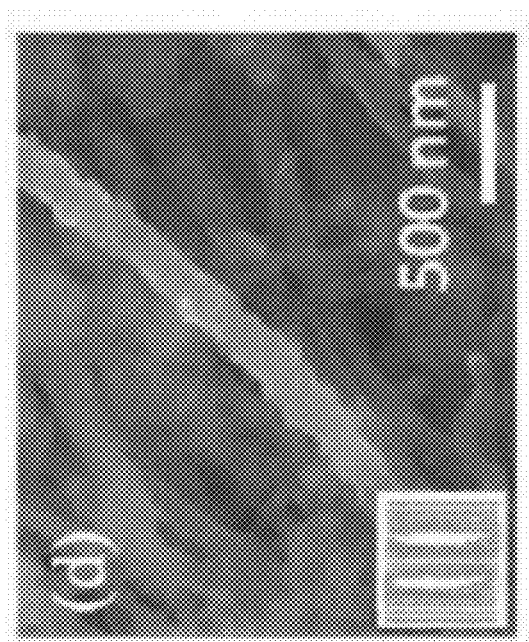
FIG. 4D shows a scanning electron microscope image of a CNT sample wetted with silica nanoparticles; after the drying process, nanoparticles adhere to the surface of individual carbon nanotubes, wherein schematic representations in the insets describe structural modifications occurring in the CNT samples.

The exemplary schematic diagram in the inset of FIG. 4B can describe the representative structural rearrangement of the CNTs after acetone evaporation. Wetting (and subsequently drying) the CNT samples with a mixture of surfactant (SDS) and acetone can result in a significantly different microstructure (see for example, the exemplary schematic diagram of FIG. 4C). In such cases, as shown in the exemplary schematic diagram of FIG. 3A, the CNTs in the array can form dense bundles emerging from the combination of van der Waals interactions and ionic charges on the CNTs' surfaces induced by the random attachment of surfactant molecules [see for example, reference 9, incorporated herein by reference in its entirety]. The schematic diagram in the inset of the exemplary schematic diagram of FIG. 4C shows the idealized densification and partial bending of the CNTs. The microstructural effects resulting from wetting (and subsequent drying) of the CNT arrays with a mixture of acetone and $SiO_2$ nanoparticles can be seen in the exemplary schematic diagram of FIG. 4D. According to some embodiments, the $SiO_2$ nanoparticles (for example, of diameter≈10-20 nm) can attach uniformly to the CNTs' surfaces, without the need for additional functionalization or chemical treatment. The schematic diagram in the inset of the exemplary schematic diagram of FIG. 4D represents the attachment of nanoparticles on the CNT surfaces and their idealized microstructural rearrangement, with no densification and bending.

As previously indicated, the density gradient measured in the as-grown CNT arrays as a function of the position on the growth substrate is shown in the example embodiment of FIG. 1. In the example embodiment of FIG. 1, the black arrow indicates the direction of the gas flow inside the chamber with respect to the substrate position. From FIG. 1, it can be observed that the as-grown CNTs' density is higher in the substrate regions closer to the gas flow input, and it decreases gradually as the CNTs grow farther from the flow input. The mechanical response of the samples can be measured as a function of density variation and chemical functionalization. Additionally, quasi-static compression tests can be performed on the samples at four different strain rates, 50%, 3%, 0.3%, and 0.03% s$^{-1}$ to, for example, a maximum strain of 50%. The mechanical response of the as-grown CNT samples obtained from the same growth substrate can be tested to study the effects of density variations during growth, as a function of their position on the substrate. The compressive modulus of the samples can then be calculated by fitting the initial linear portion of the stress-strain curve at low strain.

According to several example embodiments of the present disclosure, measured compressive moduli and the peak stresses can be a function of density. Moreover, it can be observed that, the compressive modulus and the peak stress can vary linearly with density, while the strain rate can have a negligible effect. Furthermore, linear dependence of the CNT arrays' mechanical response on density and the absence of strain rate effects can be observed by testing a large number of CNT samples obtained from different growth substrates in separate synthesis processes, with densities ranging from, for example, 0.12 to 0.28 g cm$^{-3}$. An equation representing a linear dependence of the compressive modulus on bulk density where the data for each strain rate can be fitted to the equation is represented below:

$$E = k_1 d + k_2 \quad (1)$$

In the above equation (1), E is the measured modulus, d is the CNT bulk density, and $k_1$, and $k_2$ are the fitting parameters. Similarly, an equation representing a linear dependence of peak stress on density where the data for each strain rate can be fitted to the equation is represented below:

$$\sigma = k_3 d + k_4 \quad (2)$$

In the above equation (2), $\sigma$ is the peak stress, d is the density, and $k_3$, and $k_4$ are the fitting parameters. The fitting parameters $k_3$, and $k_4$ are summarized in table 1. In particular, table 1 represents the values for the fitting parameters which can be used in equations (1) and (2) with the linear-fit trend, as described above.

TABLE 1

| Strain rate (% s$^{-1}$) | $k_1$ | $k_2$ | $k_3$ | $k_4$ |
|---|---|---|---|---|
| 0.03 | 37.414 | −3.5535 | 150.74 | −12.442 |
| 0.3 | 34.589 | −2.5387 | 165.69 | −13.894 |
| 3 | 38.556 | −2.8682 | 133.62 | −7.1712 |
| 50 | 30.013 | −1.0339 | 164.51 | −13.097 |

According to some example embodiment of the present disclosure, after testing the as-grown samples, the properties of the chemically treated samples can be characterized. In this context, it can be observed that the surface functionalization with non-covalent attachment of surfactants and SiO$_2$ nanoparticles, can alter the bulk density, influencing the mass and/or the volume of the samples. Some example values of bulk density measured before (initial) and after (final) wetting CNTs with acetone, surfactant/acetone, and SiO$_2$/acetone are shown in table 2.

TABLE 2

| Measured quantities | | CNTs/acetone | CNTs/acetone/ surfactant | CNTs/acetone/ silica particles |
|---|---|---|---|---|
| Mass (g) × 10$^{-2}$ | S1 | 1.75/1.73 | 1.64/1.77 | 1.52/1.62 |
| (initial/final) | S2 | 1.89/1.9 | 2.07/2.17 | 1.9/2.0 |
| Height (mm) | S1 | 1.94/1.87 | 1.79/1.76 | 1.78/1.77 |
| (initial/final) | S2 | 1.86/1.82 | 1.90/1.85 | 1.87/1.87 |
| Area (mm$^2$) | S1 | 37.21/36.56 | 44.54/43.12 | 41.83/41.78 |
| (initial/final) | S2 | 43.62/43.49 | 41.01/40.57 | 42.9/43.20 |
| Density (g cm$^{-3}$) | S1 | 0.25/0.25 | 0.21/0.23 | 0.20/0.22 |
| (initial/final) | S2 | 0.23/0.24 | 0.27/0.29 | 0.24/0.25 |

The example values of bulk density measured before (initial) and after (final) wetting CNTs with acetone, surfactant/acetone, and SiO$_2$/acetone, as shown in table 2, summarizes specific changes in mass, height, and surface area after wetting and drying the CNT samples with acetone, acetone/surfactants, and acetone/silica nanoparticles. As shown in table 2, two sets of samples (S1 and S2) can be measured for each type of functionalization. Changes in the overall mass of the samples can be observed after wetting with surfactant and silica nanoparticles, while no mass changes can occur after treatment with only acetone. The CNT samples' height and surface area can be reduced when the samples are treated with acetone and acetone/surfactants. This can be due to the densification, and partial bending, of the CNTs (see for example, FIGS. 4B and 4C, respectively). In some embodiments, CNT samples treated with solutions of acetone and silica nanoparticles do not present any dimensional change. The densification in such cases can be assumed to be negligible due to the repulsive effects originating from the presence of negative zeta potential [see for example, reference 10, incorporated herein by reference in their entirety] between the SiO$_2$ particles on the surface of the CNTs.

According to several example embodiments of the present disclosure, the mechanical response of the surface modified CNT samples can be analyzed using the same experimental conditions described in previous sections. For example, results obtained with quasi-static compression tests performed on CNT samples treated with acetone and surfactant (SDS), compared with as-grown, freestanding CNTs are shown in the exemplary graph of FIG. 2.

Figure 2:
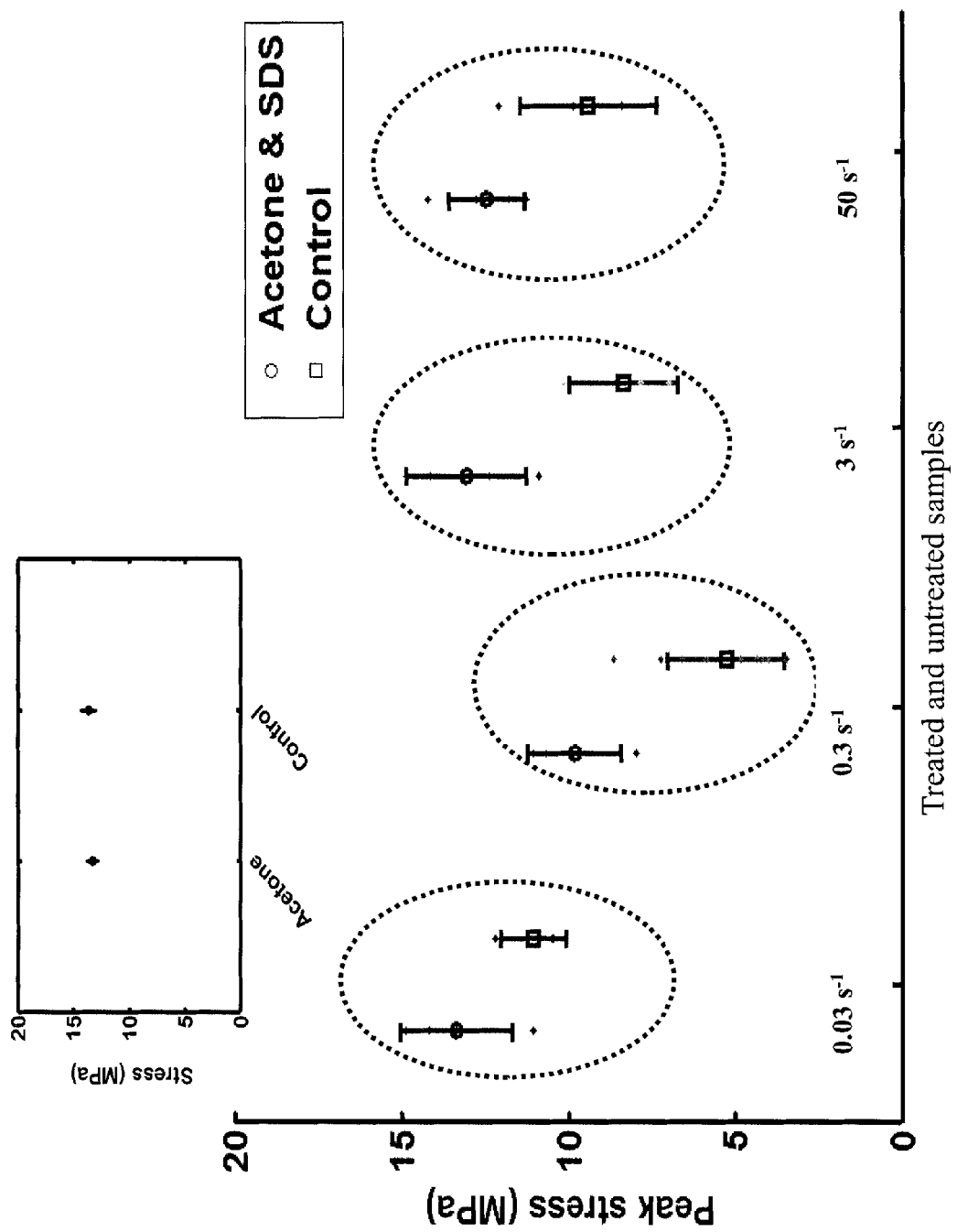
FIG. 2 shows a comparison of maximum values of compressive peak stress in samples wetted with surfactant (data points denoted by circles) and in freestanding, as-grown CNTs (control) (data points denoted by squares), at varying strain rates.

In the exemplary graph of FIG. 2, the vertical axis represents the measured peak stress, and the horizontal axis represents the different strain rates used for testing. In the exemplary case shown in FIG. 2, the samples (for example, four sets of wetted and as-grown CNT control) arrays are compared side-by-side at each strain rate (all experimental tests at the same strain rate are encircled by dotted lines). As seen from FIG. 2, the measured peak stresses are higher for the functionalized CNTs than they are for the non-functionalized CNTs, at all strain rates tested. In such cases, it can be assumed that the average peak stress was measured from the six measurements performed on six randomly selected samples, with the error bars in FIG. 2 representing the corresponding standard deviation. Such deviations can be a result of density variations in the selected samples. The results of the exemplary graph of FIG. 2 show no specific trend with strain rate.

Additionally, the higher peak stress level observed in samples functionalized with surfactant, could be related to the densification of the structure as a result of the surface modification. Further details on the interaction of surfactant (specifically SDS) with CNTs can be found in, for example, references 11-13, incorporated herein by reference in their entirety. Moreover, SDS can be used to disperse individual hydrophobic carbon nanotubes by providing anionic surface charge in the liquid medium [see for example, reference 14, incorporated herein by reference in it entirety]. SDS can densify the CNTs on the growth substrate, through capillary forces emerging when the liquid penetrates into the pores of the CNT structure [see for example, reference 2, incorporated herein by reference in its entirety]. Furthermore, freestanding CNT samples (not attached to a growth substrate) can be processed as well, which can allow the nanotubes to densify after the acetone evaporates. The same treatment applied on samples not separated from the substrate could result in different microstructures and reduced densification [see for example, references 7 and 8, incorporated herein as reference in their entirety].

In accordance with the present disclosure, the numerical studies on the mechanism of surface functionalization of single wall CNTs with SDS can be found in reference 13, incorporated herein by reference in its entirety. According to such studies, it was SDS molecules were observed form a random network on the CNT surfaces [see for example, reference 13, incorporated herein as reference in its entirety]. Such disorder could cause a non-uniform distribution of charges on the CNT surfaces, and the CNT densification can be expected to result from the attraction of oppositely charged clusters. In such cases, after acetone evaporates, the layers of surfactant can remain attached around the CNT surfaces. Moreover, in such cases it can be observed that the concentration of SDS attached on the CNTs surfaces increases with increasing CNT diameter [see for example, reference 13, incorporated herein as reference in its entirety]. Furthermore, in some cases, it can be observed that the stress experienced by the CNTs can increase significantly with the number of adhering molecules to the surface, because the applied load can be transferred more effectively between adjacent nanotubes through the attached molecule, which, according to some embodiments of the present disclosure, is surfactant [see for example, reference 3, incorporated herein as reference in its entirety].

Additionally, the higher values of peak stress observed in some experiments for the functionalized CNT array, can be explained by a similar interaction mechanism of stress transfer between CNTs. The presence of SDS molecules wrapped around the CNTs' outer walls can enhance ionic interactions between adjacent CNTs and can therefore distribute the applied load more effectively than the van der Waals interfacial interaction present in the as-grown, freestanding CNTs. In some embodiments, the advantage of non-covalent functionalization with $SiO_2$ compared to the functionalization with SDS does not affect the elastic bending response of the CNT arrays or the buckling stress, as these deformations rely less on interfacial interactions between CNTs. The details of the compressive response of CNTs including buckling and post-buckling regimes can be found, for example, in reference 1, incorporated herein by reference in its entirety.

In accordance with the present disclosure, for comparison purposes, the compressive response of CNT arrays wetted with only acetone (no surfactants included) are considered. As shown in the example embodiment of FIG. 4B, the acetone wetting, and the subsequent drying, can cause the formation of characteristic cracks on the surface of the CNTs. The mechanical response of these samples is shown in the inset of FIG. 2, together with the data acquired from the as-grown freestanding CNT arrays (control). In such cases, it can be observed that any difference in the peak stress values that may exist has not been reached in the compression of the acetone wetted and the control samples after 50% strain, at the same rate (50%/s). Such results show that, the increase in peak stress observed for the CNTs treated with SDS can be primarily due to the non-covalent functionalization. Moreover, in such exemplary cases the CNTs are wetted with the solution of acetone and $SiO_2$ nanoparticles, and dried. Further details on the dispersion property of silica nanoparticles in organic media can be found in, for example, reference 10, incorporated herein as reference in its entirety. Moreover, it can be observed that uniform dispersion in the solution is a result of the higher zeta negative potential, leading to repulsive effects between the particles [see for example, reference 10, incorporated herein as reference in its entirety].

As seen in the example embodiment of FIG. 4D, the resulting uniform particle distribution on the CNTs' surfaces can be driven by acetone modified surface interactions [see for example, reference 4, incorporated herein by reference in its entirety] between the silica particles and the carbon nanotubes. As shown in reference 5, incorporated herein by reference in its entirety, the particle affinity to attach to nanotubes can increase with the diameter and length. This could explain the high affinity found in, for example, approximately 2 mm long CNTs.

Figure 5:
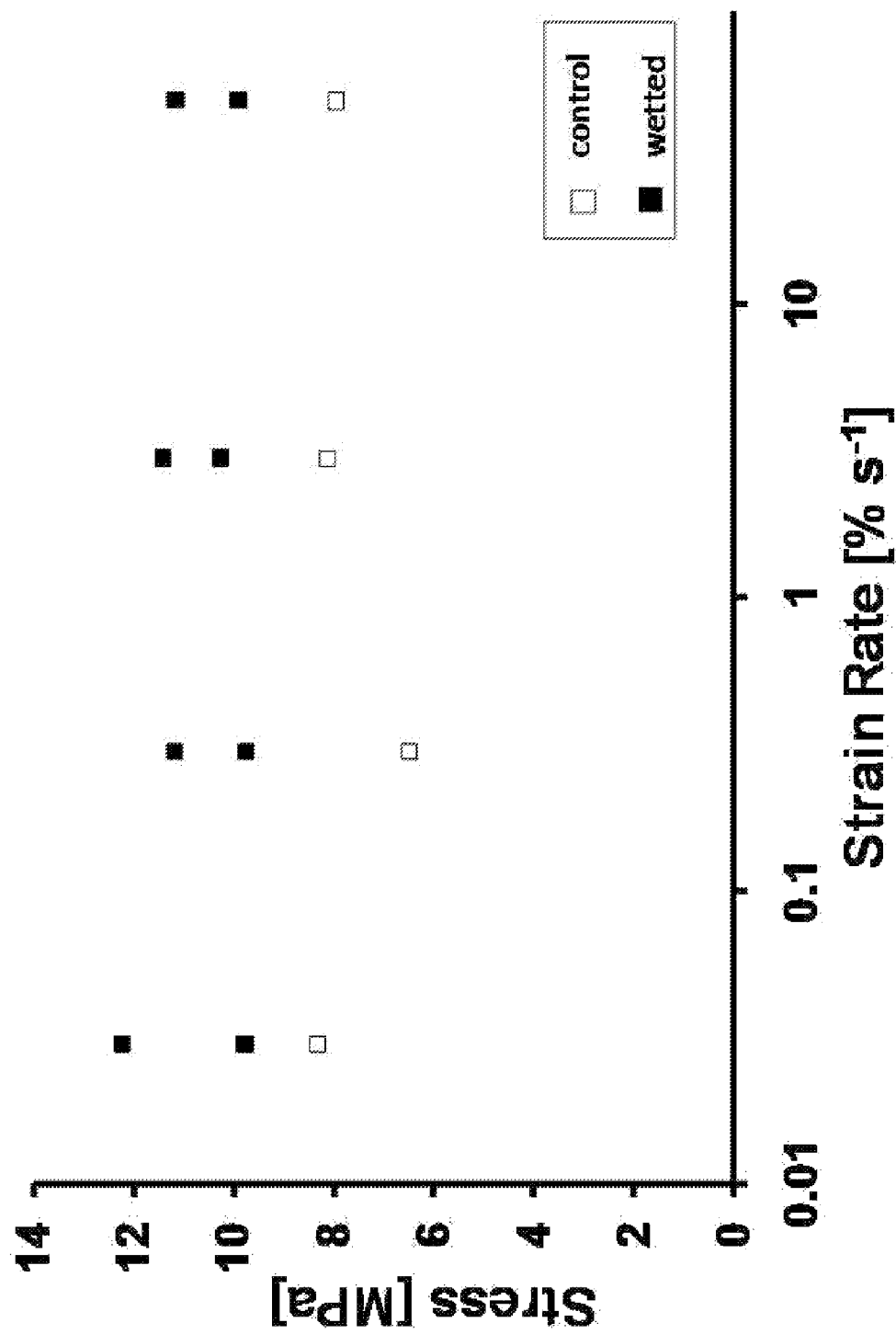
FIG. 5 shows variation of measured peak stress as a function of strain rate, where data points shown by circles represent samples with nanoparticles, and squares represent the results obtained from the as-grown (control) samples and each circle represents tests from a different strain rate (indicated on the x-axis).

According to an example embodiment of the present disclosure, the quasi-static mechanical response of CNTs coated with $SiO_2$ nanoparticles is shown in FIG. 5. In the example embodiment of FIG. 5, the inset shows a comparison between CNT samples wetted with only acetone and as-grown CNTs. As indicated in the exemplary graph of FIG. 5, each circle represents tests from a different strain rate, as indicated on the x-axis of the graph. In such cases, the samples can be extracted from the same growth substrate and can be randomly selected for the nanoparticles attachment. The measured peak stresses can then be compared (similarly as in FIG. 2) among pristine CNT samples and those coated with nanoparticles. In such cases, the level of peak stress reached in CNT samples coated by $SiO_2$ nanoparticles can be higher as compared to untreated, freestanding CNTs. The results shown in the exemplary graph of FIG. 5 are in agreement with the results shown in the exemplary graph of FIG. 2 for a large number of randomly selected samples modified with surfactant. The stiffening provided by the particles on the surface of the CNTs can play a crucial role in the densification regime. The magnitude of the stress enhancement obtained with the CNT functionalization with $SiO_2$ nanoparticles can be the same as that of the SDS functionalized CNTs. Additionally, according to some embodiments of the present disclosure, the effect of the strain rate can be negligible in the range tested in some experiments (0.03%-50% $s^{-1}$).

The examples set forth above are provided to give those of ordinary skill in the art a complete disclosure and description of how to make and use the embodiments of the disclosure, and are not intended to limit the scope of what the inventors regard as their disclosure. Modifications of the above-described modes for carrying out the disclosure may be used by persons of skill in the art, and are intended to be within the scope of the following claims. All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

A number of embodiments of the disclosure have been described. Nevertheless, it will be understood that various modifications may be made without departing from the spirit and scope of the present disclosure. Accordingly, other embodiments are within the scope of the following claims.

LIST OF REFERENCES

[1] Misra A, et al. "Synthesis and characterization of carbon nanotube-polymer multilayer structures", ACS Nano. 2011; 5(10):7713-7721.

[2] Zhou J J, Noca F and Gharib M, "Flow conveying and diagnosis with carbon nanotube arrays", *Nanotechnology* 17, 4845-53, 2006.

[3] Namilae S and Chandra N, "Role of atomic scale interfaces in the compressive behavior of carbon nanotubes in composites", Compos. Sci. Technol. 66:13, pp. 2030-2038, October 2006.

[4] Ellisa V, Vijayamohanan K, Goswami R, Chakrapani N, Ramanathan L S, Ajayan P M and Ramanath G, "Hydrophobic anchoring of monolayer-protected gold nanoclusters to carbon nanotubes", Nano Lett. 3 (3). pp. 279-282. ISSN 1530-6984, 2003.

[5] Rance G A, Marsh D H, Bourne S J, Reade T J and Khlobystov A N, "van der Waals interactions between nanotubes and nanoparticles for controlled assembly of composite nanostructures" ACS Nano. 4(8):4920-8; 2010 Aug. 24.

[6] Misra A, Raney J R, Craig A E, and Daraio C, "Effect of density variation and non-covalent functionalization on the compressive behavior of carbon nanotube arrays", *Nanotechnol.* 22, 425705 (2011).

[7] Chakrapani N, Wei B, Carrillo A, Ajayan P M and Kane R S, "Capillarity-driven assembly of two-dimensional cellular carbon nanotube foams", Proc. Natl Acad. Sci. 101 4009-12; 2004.

[8] Kaur S, Sahoo S, Ajayan P M and Kane R, "Capillarity-driven assembly of carbon nanotubes on substrates into dense vertically aligned arrays", Adv. Mater. 192984-7; 2007.

[9] Yurekli K, Mitchell C A and Krishnamoorti R, "Small-angle neutron scattering from surfactant-assisted aqueous dispersions of carbon nanotubes", J. Am. Chem. Soc. 126 9902-3; 2004.

[10] Du M and Zheng Y, "Modification of silica nanoparticles and their application in UDMA dental polymeric composites", Polym. Compos. 28 198-207; 2007.

[11] O'Connell M J et al. "Band gap fluorescence from individual single-walled carbon nanotubes", Science 297 593-6; 2002.

[12] Arnold M S, Green A A, Hulvat J F, Stupp S I and Hersam M C, "Sorting carbon nanotubes by electronic structure using density differentiation", Nature Nanotechnol. 1 60-5; 2006.

[13] Tummala N R and Striolo, "A SDS surfactants on carbon nanotubes: aggregate morphology", ACS Nano. (3) 595-602; 2009.

[14] Vaisman L, Wagner H D and Marom G, "The role of surfactants in dispersion of carbon nanotubes", Adv. Colloid Interface Sci. 128 37-46; 2006.

The invention claimed is:

1. A method for controlling microstructural arrangement of nominally-aligned arrays of carbon nanotubes (CNTs), the method comprising functionalizing CNT surfaces, wherein functionalizing CNT surfaces comprise a non-covalent functionalization of CNT surfaces, wherein the non-covalent functionalization of CNT surfaces is obtained by first separating the arrays of CNTs from a growth substrate and then subsequently wetting the CNTs in a volatile solvent comprising a functionalization substance, wherein the arrays' CNTs densify after the solvent evaporates, wherein freestanding CNT samples wetted with the solution of volatile solvent and functionalization substance are first sonicated and in subsequent steps are dried after evaporation of the volatile solvent.

2. The method according to claim 1, wherein the volatile solvent is acetone.

3. The method according to claim 1, wherein after evaporation of the volatile solvent, the functionalization substance remains among the CNTs and causes changes in CNTs interactions.

4. A method for synthesizing a foam structure comprising nominally-aligned arrays of carbon nanotubes (CNTs), the method comprising:
positioning a flow input of a carrier gas carrying a precursor solution at a distance and a flow direction in relation to a position on a substrate for a growth of the nominally-aligned arrays of carbon nanotubes (CNTs); and
synthesizing the nominally-aligned arrays of carbon nanotubes (CNTs) by controlling the flow direction, wherein the density of the nominally-aligned arrays of carbon nanotubes (CNTs) is between 0.12 to 0.28 g cm$^{-3}$; and
further controlling the density of the nominally-aligned arrays of carbon nanotubes (CNTs) by wetting the synthesized nominally-aligned arrays of carbon nanotubes (CNTs) in a solution comprising a functionalization substance.

5. The method according to claim 4, wherein the arrays of CNTs are first detached from a growth substrate and in subsequent step the functionalization substance is added to the arrays of CNTs.

6. The method according to claim 4, the solution comprises a volatile solvent, wherein the arrays of CNTs densify after the solvent evaporates.

7. The method of claim 6, wherein the volatile solvent is acetone.

8. The method of claim 6, wherein the solution of volatile solvent and the functionalization substance is sonicated to obtain uniform dispersions before wetting CNT arrays.

9. The method of claim 6, wherein freestanding CNT samples wetted with the solution of volatile solvent and the functionalization substance are first sonicated and then dried.

10. The method of claim 4, wherein the functionalization substance is a surfactant.

11. The method of claim 4, wherein the functionalization substance is SDS.

12. The method according to claim 4, wherein the functionalization substance comprises silica ($SiO_2$) nanoparticles.

* * * * *